April 12, 1966

C. B. A. WICKENHAGEN 3,246,228

STATIC FREQUENCY CHANGER

Filed Dec. 4, 1961

INVENTOR.
CORNELIS B. A. WICKENHAGEN
BY
Flam and Flam
ATTORNEYS.

INVENTOR.
CORNELIS B. A. WICKENHAGEN
BY
Flam and Flam
ATTORNEY

April 12, 1966 C. B. A. WICKENHAGEN 3,246,228
STATIC FREQUENCY CHANGER
Filed Dec. 4, 1961 5 Sheets-Sheet 5

INVENTOR.
CORNELIS B. A. WICKENHAGEN
BY
Flam and Flam
ATTORNEY

United States Patent Office 3,246,228
Patented Apr. 12, 1966

3,246,228
STATIC FREQUENCY CHANGER
Cornelis B. A. Wickenhagen, Lawndale, Calif., assignor, by mesne assignments, to Emerson Electric Co., a corporation of Missouri
Filed Dec. 4, 1961, Ser. No. 158,933
2 Claims. (Cl. 321—7)

This application is a continuation-in-part of application Serial No. 87,600, filed February 7, 1961 and now abandoned.

This invention relates to a static frequency changer.

In many industrial processes, it is desirable simultaneously to control the speed of remotely located motors. This may be desirable, for example, in connection with processes utilizing a moving conveyor. Control has often been accomplished by providing a variable ratio transmission mechanism for operating an alternator. Several induction motors are then supplied by the variable frequency output of the alternator and a speed control is correspondingly effected. An object of the present invention is to provide a unique static frequency changer that fulfills the source requirements of such systems.

Another object of this invention is to provide an efficient frequency changer having the characteristics of an inverter, and in which alternating current from a commercial source is converted into polyphase or single phase alternating current of any desired frequency without first converting the commercial source to direct current.

Another object of this invention is to provide a static frequency changer which efficiently converts commercial power into power of a desired frequency.

Another object of this invention is to provide apparatus of this character that utilizes simplified circuitry.

Still another object of this invention is to provide improved operating characteristics of slave motors by adjusting the control devices that determine the frequency of the changer. Thus, without actually switching the power leads for the motor, the slave motors can be braked by the so-called plugging process merely by shifting the output of the control device. Also, by shaping the output of the control device, a regenerative relationship between the motors and the frequency changer for braking purposes can quickly be brought about. Furthermore, gradual starting and stopping can be achieved by slow changes in the control frequency; jogging can likewise be accomplished with ease.

Another object of this invention is to make possible the master control of a series of frequency changers that requires no elaborate servo-mechanism or error detecting devices. For this purpose, a single variable frequency device can be used for simultaneous control of a series of frequency changers.

Still another object of this invention is expeditiously to use a tachometer to obtain control of frequency and phase relationships.

Still another object of this invention is to provide a static frequency changer having some of the characteristics of an inverter in which the usual commutating condenser can be eliminated.

This invention possesses many other advantages, and has other objects which may be made more clearly apparent from a consideration of several embodiments of the invention. For this purpose, there are shown a few forms in the drawings accompanying and forming a part of the present specification. These forms will not be described in detail, illustrating the general principles of the invention; but it is to be understood that this detailed description is not to be taken in a limiting sense, since the scope of the invention is best defined by the appended claims.

Referring to the drawings.

Figure 1:
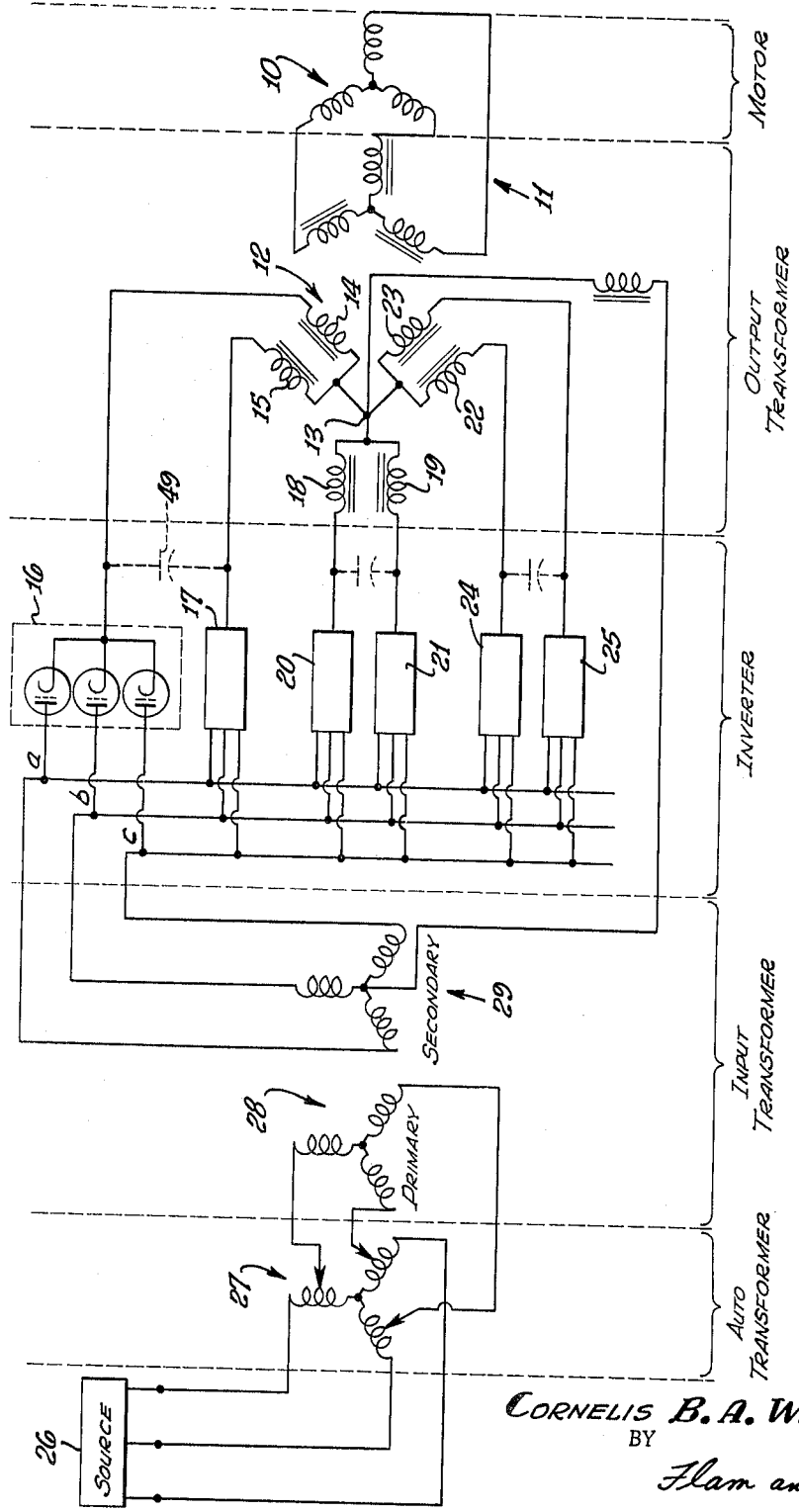
FIGURE 1 is a diagrammatic view of a static frequency changer incorporating the present invention, and used, in this instance, for providing power at a variable frequency to an induction motor.

In FIG. 1, there is diagrammatically illustrated a three-phase slave motor 10 connected to the secondary winding 11 of a three-phase transformer system. The primary winding 12 of the transformer, in this instance, is shown as star connected, the several branches extending from a neutral point 13. Each phase branch of the transformer primary winding 12 includes two winding sections. The sections 14 and 15 of one branch each have ends connected to the neutral point 13.

These primary winding sections 14 and 15 are driven in alternation by inverter sections 16 and 17. Primary winding sections 18 and 19 for a second phase of the system are driven by inverter sections 20 and 21. Similarly, primary winding sections 22 and 23 for a third phase of the system are driven by inverter sections 24 and 25.

Excitation for the several inverter sections 16–17, 20–21, and 24–25 is provided by a commercial multiphase source generally designated at 26. The source 26, in the present instance, drives an autotransformer 27, which may compensate for the characteristics of the motor 10 at different frequencies. The transformer 27 in turn drives an input transformer 28.

The input transformer 28 has leads $a$, $b$, and $c$ from the three-phase star-connected secondary 29. These leads $a$, $b$, and $c$ provide voltage at a value determined by that of the source 26, autotransformer 27 and input transformer 28. The frequency at the leads $a$, $b$, and $c$ is, of course, that of the commercial source 26.

Figure 2:
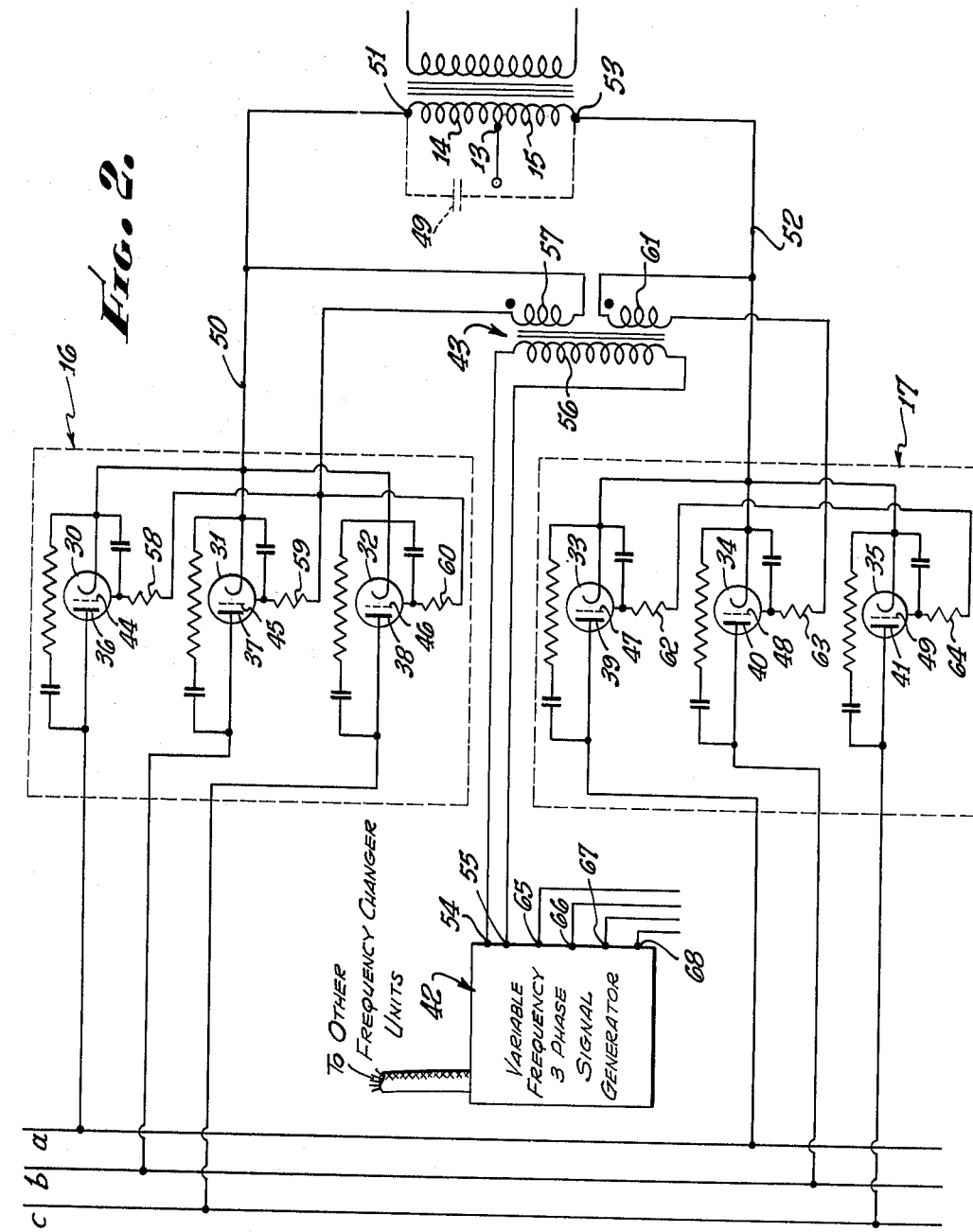
FIG. 2 is a diagrammatic view illustrating one section of the apparatus shown in FIG. 1.

The manner in which each of the three phases of the inverter operates is best shown in FIG. 2, where there are illustrated the primary winding sections 14 and 15 which form a part of the primary structure 12.

The inverter shown in FIG. 2 appears to be similar to a conventional parallel inverter except that instead of one unidirectionally conductive device in each of the inverter sections 16 and 17, there are three. Thus, in the inverter section 16, there are unidirectionally conductive devices 30, 31, and 32 in the form of thyratrons, and in the inverter section 17 there are three similar unidirectional conductive devices 33, 34, and 35.

Furthermore, instead of a source of direct current applied to the plates 36, 37, 38, 39, 40, and 41, the plates are connected respectively to the several phase leads $a$, $b$, and $c$ which constitute an alternating current source. A generator 42 provides an alternating current signal that causes the inverter sections alternately to be conductive and at the frequency of the generator 42. For this purpose, a transformer 43, driven by the generator 42, cooperates with the grids 44, 45, 46, 47, 48, and 49 of the thyratrons 30, 31, 32, 33, 34, and 35. The grids 44, 45, and 46 of the inverter section 16 are all at a firing potential when the grids 47, 48, and 49 for the thyratrons of the opposite inverter section 17 are held below firing potential.

The relative situation changes at the frequency of the signal generator 42 and in a conventional manner. Thus, the inverter sections 16 and 17 are alternately conductive at the frequency of the controlled variable frequency signal generator 42.

The thyratrons 30, 31, and 32 of one section 16 do not conduct simultaneously. Instead, they conduct only when their plates 36, 37, and 38 are positive relative to their cathodes, but then only when the signal generator 42 places the grids 44, 45, and 46 at a firing potential. In a three-phase system, of course, at least one of the plates 36, 37, or 38 must be positive, and often two of the plates are positive. Hence, the current adequate to fulfill the requirements of the inverter section 16 is distributed among the unidirectionally conductive devices 30, 31, and 32. Current will flow only through that device which has the highest plate voltage since the conduction through that device operates to impose a relatively positive voltage at the cathodes of the companion devices.

Figure 3:
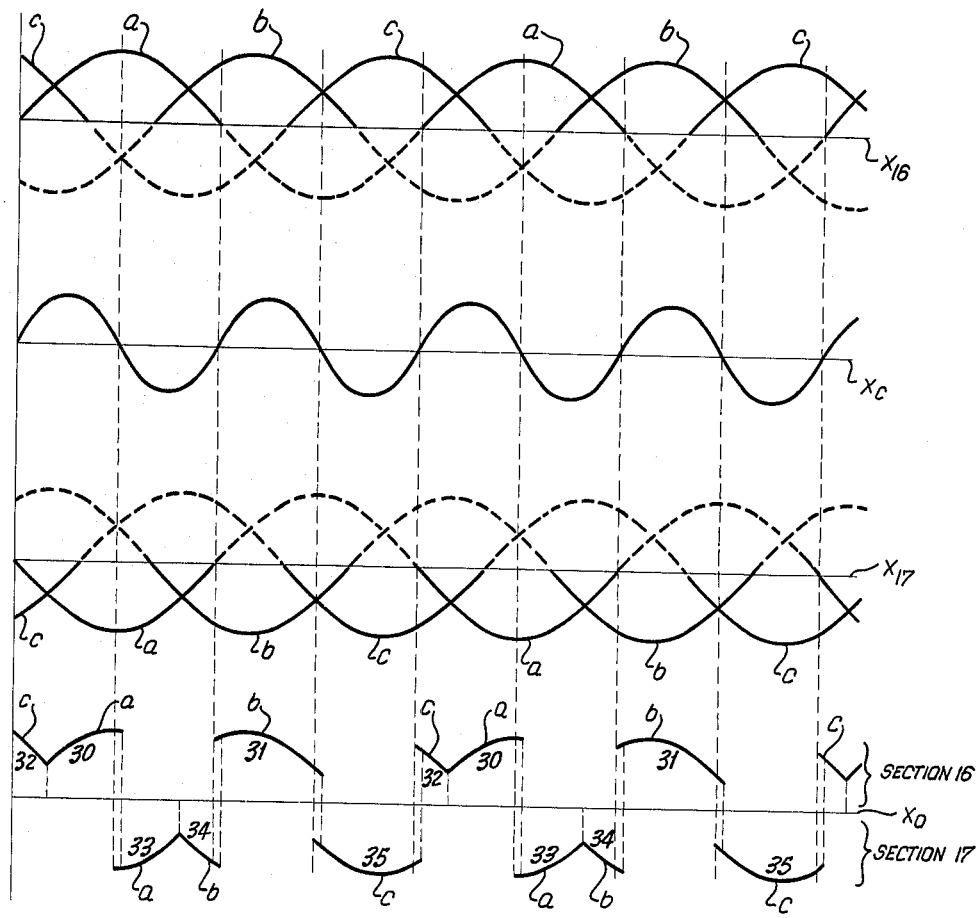
FIG. 3 is a graphical representation illustrating the operation of the system of FIG. 1.

Thus, as shown in FIG. 3, the curves $x_{16}$ and $x_{17}$ show the usable voltage at the leads $a$, $b$, and $c$ for inverter sections 16 and 17. At the plot $x_c$ is illustrated the control voltage, which in this instance is twice the frequency of the source. When the control voltage swings positive, the grids 44, 45, and 46 for the thyratrons 30, 31, and 32 of the inverter section 16 may be fired; and oppositely, when the control voltage swings negative, the thyratrons 33, 34, and 35 of section 17 may be fired. At the plot $x_0$ are illustrated the conduction angles of the devices. At the origin, the control voltage at $x_c$ permits firing of the devices of inverter section 16. The plate voltage at device 32 is highest, hence it alone is conductive. Shortly, the plate voltage at device 30 is highest, and it conducts, extinguishing device 32. The control voltage then swings negative and devices of inverter section 17 fire, etc.

The result is alternate conduction in the inverter branches at the frequency determined by the control voltage.

A similar graphical representation can be made wherein the frequency of the control voltage is less than that of the source. The range of operation is continuous from zero.

There is illustrated a typical commutating condenser 49 (FIGS. 1 and 2) across the primary windings 14 and 15. The commutating condenser 49 extinguishes the devices or thyratrons of one inverter section upon firing of the opposite inverter section, thereby restoring grid control. At output frequencies low in comparison to the source, the thyratrons largely extinguish themselves as the plate voltage falls to zero in accordance with alterations of the source. The commutation problem is simplified. In fact, by applying a suitable D.C. bias in the grid circuits, the conduction in one inverter section can be stopped before conduction of the other inverter section. In this case, the condenser 49 operates primarily to correct power factor. In the example illustrated in FIG. 3, the condenser 49 performs a commutating function, and there is a short overlap in conduction of the sections.

The cathodes of all of the thyratrons 30, 31, and 32 for the inverter section 16 are connected together and to a lead 50 (FIG. 2) to the high potential terminal 51 of the primary winding section 15. Correspondingly, the cathodes for the thyratrons 33, 34, and 35 for the opposite inverter section 17 are connected together and via a lead 52 to the high potential terminal 53 for the opposite output transformer winding section 15.

The signal generator 42 has output terminals 54 and 55 for use in connection with the phase as shown in FIG. 2. The terminals connect to a primary winding 56 of the transformer 43. One of two secondary windings 57 is connected between the cathodes of the thyratrons 30, 31, and 32 on the one hand, and grid resistors 58, 59, and 60 on the other hand for the respective grids 44, 45, and 46. A second secondary winding 61 connects across the common connected cathodes of the thyratrons 33, 34, and 35 and grid resistors 62, 63, and 64. The polarity of the secondary windings 57 and 61 is opposite so that the sequential operation of the inverter sections 16 and 17 is accomplished.

The inverter sections 16 and 17, as shown in FIG. 1, produce one phase of a multiphase system. The inverter sections 20, 21 and 24, 25 provide the second and third phases of the system. Each inverter section derives energization from all of the multiphase leads $a$, $b$, and $c$.

The variable three phase signal generator 42 has as many sets of output terminals as there are phases in the output of the device. Thus, the generator 42 has, in addition to its terminals 54 and 55, terminals 65 and 66 for use in controlling the operation of the inverter sections 20 and 21 and terminals 67 and 68 for use in controlling the firing of inverter sections 24 and 25. It is, of course, understood that the signals produced at the three sets of terminals of the signal generator 42 are in three-phase relationship with respect to each other.

In practice, a three-phase alternating current source is normally available for use, and thus the three-phase sytem disclosed in FIG. 1 is a likely embodiment. However, as many source leads $a$, $b$, $c$ may be provided as there are phases of the commercial source. Each inverter section then may have as many unidirectionally conductive devices or groups of unidirectionally conductive devices as there are distinctive phases. Optionally, the number need not correspond. For example, each inverter section may be provided with two unidirectionally conductive devices for use in cooperation with the phases of a two-phase source or with two phases of a four-phase source, etc.

Figure 4:
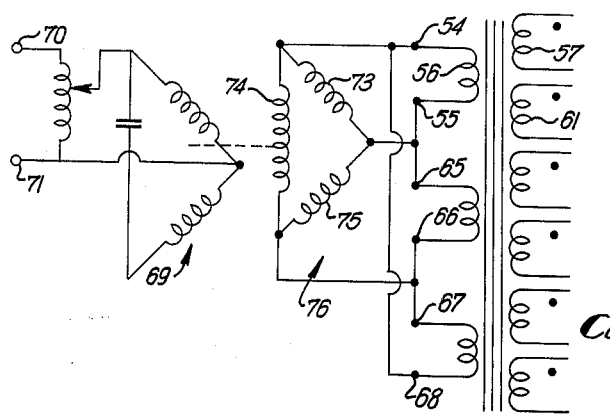
FIG. 4 is a diagrammatic view illustrating, by way of example, one specific device for providing the variable frequency signal.
Figure 5:
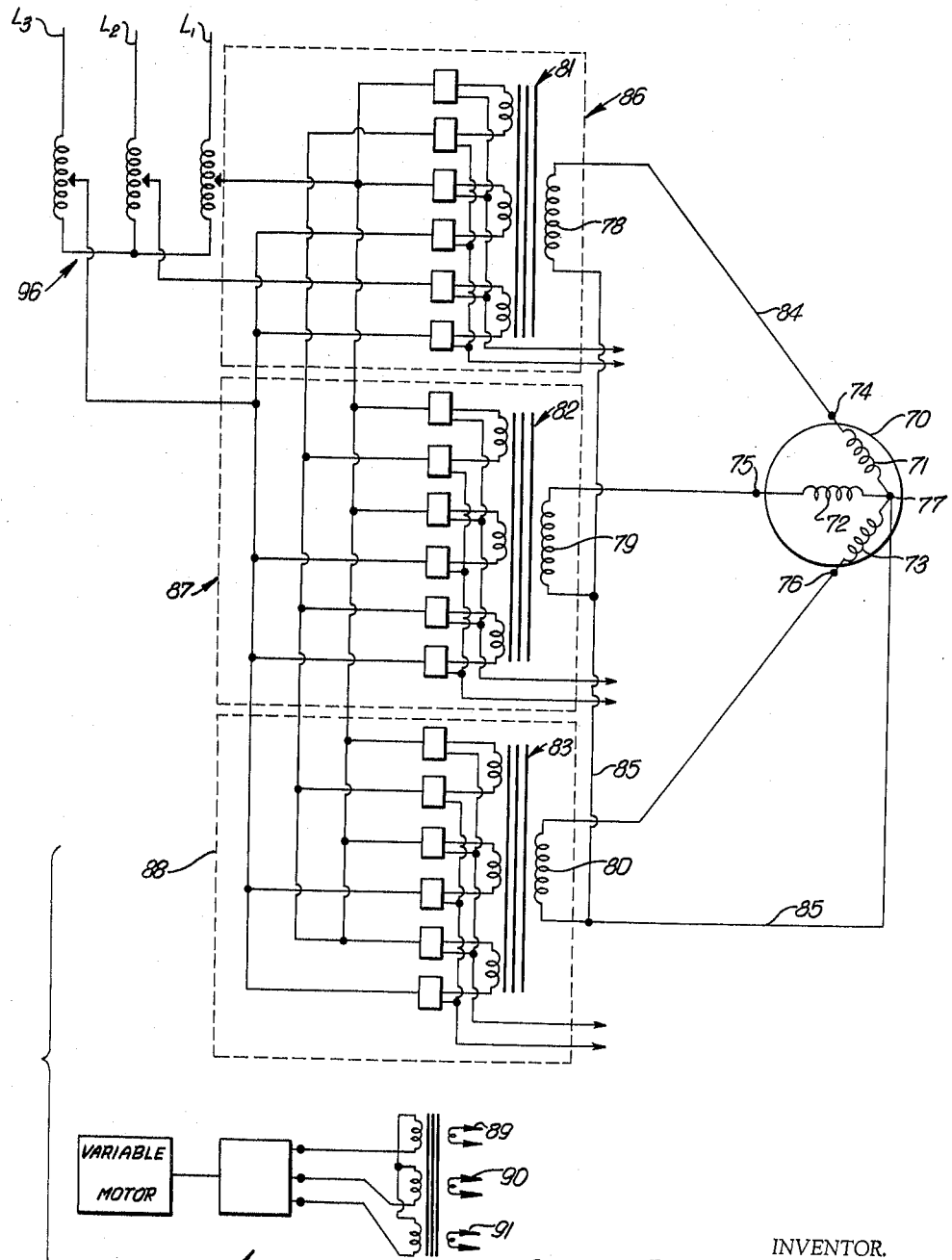
FIG. 5 is a diagrammatic view similar to FIG. 1, illustrating another embodiment of the present invention.

In FIG. 4, there is illustrated by way of example a motor-generator set that may comprise the variable frequency three-phase signal generator 42. Optionally, the generator 42 can be an oscillator or any other suitable device. However, in FIG. 4, a motor 69 is variably excited from single-phase source terminals 70 and 71 by the aid of an auto-transformer winding 72. Further illustrated in FIG. 5 are the armature windings 73, 74, and 75 of the three-phase generator structure 76. The transformer primary winding 56 and the secondary windings 57 and 61, all previously identified, are illustrated in FIG. 4.

Due to the fact that alternating current of source is converted to a new frequency without a direct current stage, a rectifier between the source and the inverter sections is obviated.

The unidirectionally conductive devices 30, 31, and 32 of the multiple-phase system or section 16 are connected in star, the primary winding section 14 being included in each phase branch. Each phase branch may, however, have its own transformer winding section, which it necessarily would have if the device 30, 31, and 32 were mesh connected.

Many other connections of the multiple-phase systems are possible. For example, full-wave or half-wave systems can be provided.

Adjustment of the signal generator 42 determines the operation of slave motors, such as the motor 10 (FIG. 1). Gradual starting and stopping results from gradual increase of signal generator frequency from zero, and gradual decrease to zero. Slave motor speed is quickly varied or jogged by corresponding changes in signal generator frequency. Whereas braking by the plugging process usually involves switching power leads to the motors, it is only necessary to shift the signal generator output. A decreased excitation of the frequency changer may be accomplished by reducing the pulse width of the signal generator output, thereby achieving regenerative braking.

To make possible simultaneous control of several frequency changer systems, the signal generator 42 can be used as a master control. Illustrated in FIG. 2 is a cable that contains control leads for such other systems. Use of elaborate error detecting devices to ensure correlated operation is avoided.

Figure 6:
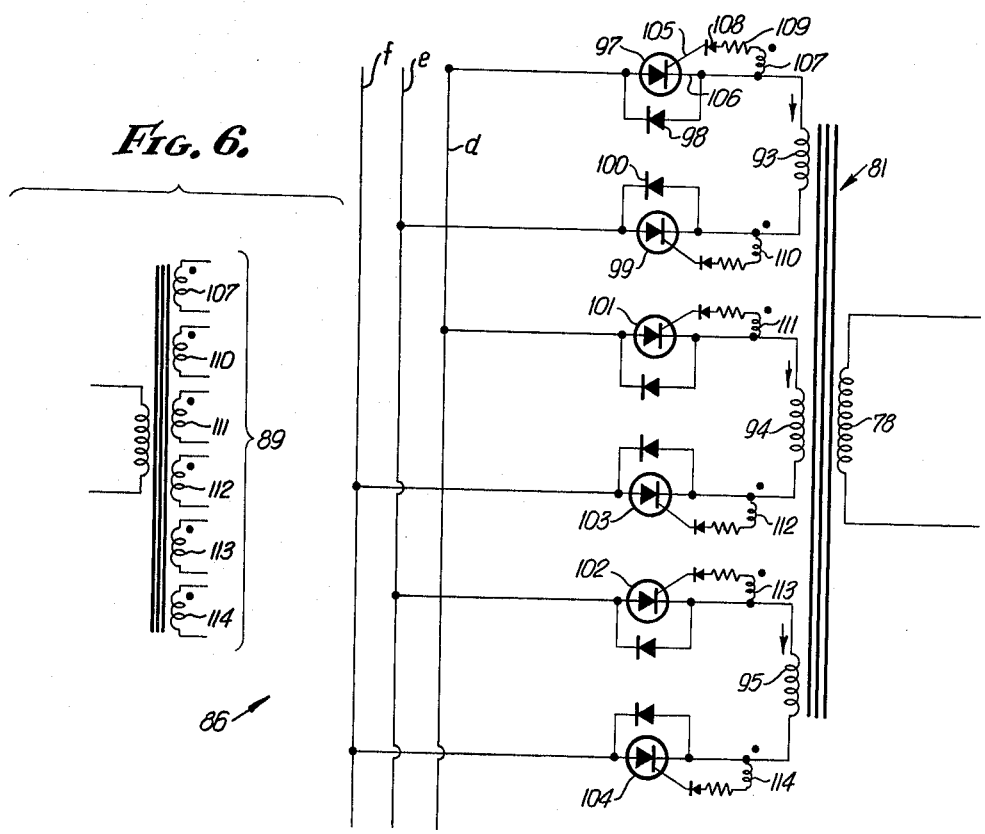
FIG. 6 is a diagrammatic view illustrating one section of the apparatus shown in FIG. 5.
Figure 7:
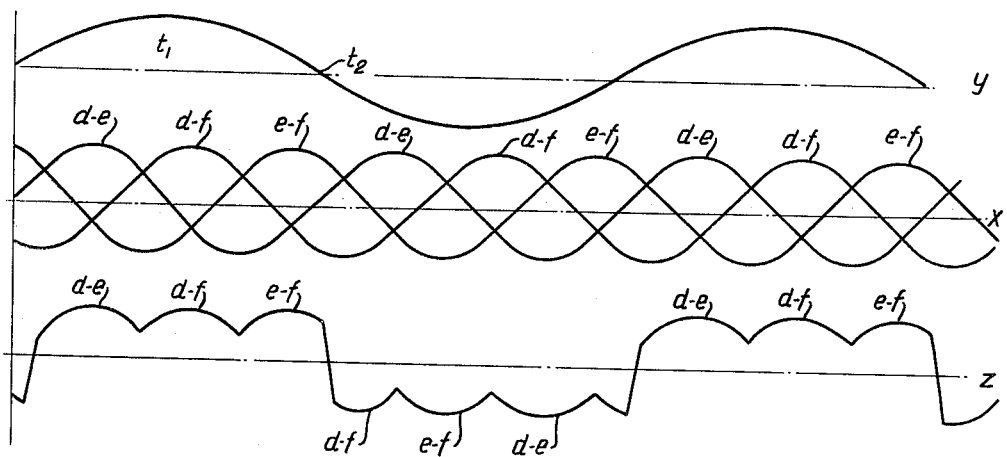
FIG. 7 is a graphical representation illustrating the operation of the system of FIG. 5.

In the form illustrated in FIGS. 5, 6 and 7, controlled rectifiers are used in place of thyratrons, and the several inverter sections are mesh connected.

Thus, in FIG. 5, there is diagrammatically illustrated a three-phase motor 70 that has armature windings 71, 72 and 73 for three-phase excitation. The windings 71, 72 and 73 each extend between corresponding motor input terminals 74, 75 and 76 and a common or neutral terminal 77.

Secondary windings 78, 79 and 80 of transformers 81, 82 and 83 serve to excite the motor windings 71, 72 and 73. Thus, one side of the winding 78 is connected by a lead 84 to the terminal 74, and the other side of the transformer winding 78 connects to a neutral lead 85 and the neutral terminal 77. The secondary windings 79 and 80 are similarly connected across the motor windings 72 and 73 to provide excitation therefor. If desired, the connection between the neutral terminal 77 of the motor 70 and the neutral lead of the transformer secondary windings 78, 79 and 80 may be deleted.

The secondary winding 78, 79 and 80 may also excite delta connected windings of a motor. In this instances, the neutral leads 85 would be open and suitable connections made from the ends of the respective transformer secondary windings 78, 79 and 80.

Inverter sections 86, 87 and 88 excite the transformers 81, 82 and 83 in three-phase relationship. The inverter sections 86, 87 and 88 are identical, except that they are controlled in three-phase relationship by separate windings sets 89, 90 and 91 of a three-phase variable frequency pilot generator 92. A description of one of the inverter sections 86 (FIG. 6) suffices as a description of the others.

The output transformer 81 has three primary windings 93, 94 and 95 which derive excitation respectively from the several phases of a source provided by source leads $d$, $e$, and $f$. These source leads may be connected to commercial three-phase supply lines $L_1$, $L_2$, and $L_3$ via autotransformer 96 (FIG. 5). The transformer primary winding 93 (FIG. 6) is connected across source leads $e$ and $d$. One side of the transformer winding 93 connects with the source lead $d$ through either a controlled rectifier 97 or a unidirectionally conductive diode 98 connected in back-to-back relationship across the controlled rectifier 97. The other side of the primary winding 93 connects to the source lead $e$ via a controlled rectifier 99 or a unidirectionally conductive diode 100 connected in back-to-back relationship across the controlled rectifier 99.

The controlled rectifiers 97 and 99 are oppositely polarized. During one half cycle of the source phase $d$–$e$ current flows in the arrow (or positive) direction via controlled rectifier 97 and rectifier 100, and in accordance with the conductivity of the controlled rectifier 97. In the next half cycle of the source phase $d$–$e$, current flows opposite the arrow, via devices 99 and 98 and in accordance with the conductivity of the controlled rectifier 99.

The other primary windings 94 and 95 have similar circuits, except they are connected to the two remaining source phases $d$–$f$ and $e$–$f$, respectively.

Controlled rectifiers 101 and 102 for primary windings 94 and 95 when conductive allow current to pass in the arrow or positive directions. Controlled rectifiers 103 and 104 when conductive allow current to pass in the negative direction.

At least one of the phases $d$–$e$, $d$–$f$, or $e$–$f$ must be positive at any one time, as shown by the composite voltage plot at $x$ in FIG. 7. Similarly, at least one of the phases is negative. Hence, at least one of the transformer primaries 93, 94, or 95 is available at any time to sustain a current in one direction or the other, correspondingly to actuate the secondary winding 78. Conduction in any one of the windings 93, 94, or 95 is just as effective as conduction of any other.

Control windings of the set 89 cause rectifiers 97, 101, and 102 to be conductive for the first half cycle of the variable frequency generator 92, and then to cause rectifiers 100, 103, and 104 to be conductive for the next half cycle of the variable frequency generator. Thus, the transformer 81 is operated at the frequency of the pilot generator 92.

The controlled rectifier 97 has a gate lead 105 and a cathode lead 106. One winding 107 of the set 89 is connected across these leads, reverse blocking diode 108 and a current limiting resistor 109 being interposed in the circuit. The remaining rectifiers have similar control crcuits including other windings 110, 111, 112, 113, and 114 of the set 89.

The polarities of the windings 107, 110, 111, 112, 113, 114, and the blocking diodes are such that the windings 107, 111, and 113 generate voltages adequate to pass saturating current to rectifiers 97, 101, and 102 and switch them on during the first half of the pilot generator cycle while the rectifiers 99, 103, and 104 are switched off. The opposite switching arrangement results on the next half cycle of the pilot generator.

At $y$ in FIG. 7, the waveform of the pilot generator is shown. For simplicity of illustration, the frequency of the pilot generator is half that of the source leads $d$, $e$, and $f$. At the time $t_1$ for example, the pilot voltage is positive and so is the phase voltage $d$–$e$. Hence, as shown at curve $z$ in FIG. 7, the phase voltage $d$–$e$ and winding 93 sustain positive current in transformer 81. As the phase voltages decrease and increase, the burden of sustaining this positive voltage shifts to phases $d$–$f$ and winding 94, etc.

At the time $t_2$, the pilot generator calls for a reverse of current in transformer 81. The phase $d$–$f$ and winding 94 sustains this burden.

Thus negative conduction via controlled rectifier 103 builds up in opposition to voltage induced in winding 94, and induces a voltage in winding 95 that terminates positive conduction in winding 95. Commutation is thus accomplished.

The waveform illustrated at $z$ has a large fundamental component the frequency of which corresponds to that of the pilot generator shown in $y$.

The inventor claims:

1. In an alternating current system for supplying electrical energy at a selected frequency from a three-phase supply line independently of the line frequency: a load coupling transformer having three primary windings and a secondary winding inductively coupled to each of said primary windings; a circuit for each primary winding connecting the primary winding across one phase of the source, each circuit including, in series, first and second controlled rectifiers arranged in opposing polarities, and by-passing unidirectionally conductive devices paralleling the controlled rectifiers and arranged to pass current in directions opposite that of their corresponding controlled rectifiers; and common signal means for triggering the first controlled rectifiers and the second controlled rectifiers in 180° relationship at a selected frequency.

2. In an alternating current system for supplying electrical energy at a selected frequency from a three-phase supply line independently of the line frequency: a load coupling transformer having three primary windings and a secondary winding inductively coupled to each of said primary windings; a circuit for each primary winding connecting the primary winding across one phase of the source, each circuit including, in series, a first and a second controlled rectifiers arranged in opposing polarities, and by-passing unidirectionally conductive devices paralleling the controlled rectifiers and arranged to pass current in directions opposite that of their corresponding controlled rectifiers, each of said rectifiers having a gate; a control circuit for each gate including a blocking unidirectionally conductive device and a transformer coil; and common signal generating means for exciting said coils at a selected frequency so that the first controlled rectifiers and the second controlled rectifiers are triggered in 180° phase relationship.

References Cited by the Examiner

UNITED STATES PATENTS

| 2,447,134 | 8/1948 | Nims | 321—61 |
| 2,623,203 | 12/1952 | Demuth | 318—231 |
| 2,713,657 | 7/1955 | Toulon | 318—231 |
| 2,784,365 | 3/1957 | Fenemore et al. | 318—231 |

ORIS L. RADER, *Primary Examiner.*

JOHN F. COUCH, *Examiner.*